(12) United States Patent
Wang et al.

(10) Patent No.: US 8,665,806 B2
(45) Date of Patent: Mar. 4, 2014

(54) PASSIVE COORDINATION IN A CLOSED LOOP MULTIPLE INPUT MULTIPLE OUTPUT WIRELESS COMMUNICATION SYSTEM

(75) Inventors: Fan Wang, Chicago, IL (US); Amitabha Ghosh, Buffalo Grove, IL (US); Bishwarup Mondal, Oak Park, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 12/561,377

(22) Filed: Sep. 17, 2009

(65) Prior Publication Data

US 2010/0142462 A1 Jun. 10, 2010

Related U.S. Application Data

(60) Provisional application No. 61/120,914, filed on Dec. 9, 2008.

(51) Int. Cl.
*H04W 4/00* (2009.01)
*H04B 7/14* (2006.01)

(52) U.S. Cl.
USPC .......................................... 370/329; 370/315

(58) Field of Classification Search
USPC ................................................ 370/329, 315
See application file for complete search history.

(56) References Cited

U.S. PATENT DOCUMENTS

| | | | |
|---|---|---|---|
| 2002/0154705 A1 | 10/2002 | Walton et al. | |
| 2003/0185310 A1 | 10/2003 | Ketchum et al. | |
| 2006/0120477 A1 | 6/2006 | Shen et al. | |
| 2006/0264184 A1 * | 11/2006 | Li et al. | 455/101 |
| 2009/0088172 A1 * | 4/2009 | Lusky et al. | 455/446 |
| 2009/0264142 A1 * | 10/2009 | Sankar et al. | 455/501 |

FOREIGN PATENT DOCUMENTS

| | | | |
|---|---|---|---|
| EP | 1988653 | * | 5/2008 |
| KR | 10-2003-0007481 A | | 1/2003 |
| KR | 10-2004-0089748 A | | 10/2004 |
| KR | 10-2007-0086976 A | | 8/2007 |
| WO | WO 01-43309 A2 | | 6/2001 |

OTHER PUBLICATIONS

Byeong Gyun Kim, "Corresponding Application PCT/US2009/064755—PCT International Search Report and Written Opinion," WIPO, ISA/KR, Korean Intellectual Property Office, Deajeon, Republic of Korea, Apr. 26, 2010, 11 pages, most relevant pp. 6-7 and 10-11.

(Continued)

*Primary Examiner* — Mark Rinehart
*Assistant Examiner* — Angel Brockman

(57) ABSTRACT

A system and method for passive coordination of base stations in a closed-loop multiple-input multiple-output wireless communication system, includes a first step 400 of allocating a subframe zone to be used by a serving base station and a neighboring base station to provide synchronized communications. A next step 402 includes defining at least one beam combination for the base stations, the beam combination to be used over at least one resource block of the allocated zone. A next step 406 includes reporting feedback on measured channel conditions for the zone at a first time for the at least one beam combination and associated resource block of the zone. A next step 408 includes providing synchronized communications using the feedback by the base stations over the zone at a second time by repeating the same associated at least one beam combination and associated resource block of the zone.

19 Claims, 4 Drawing Sheets

(56) References Cited

OTHER PUBLICATIONS

Wendy C. Wong and Shilpa Talwar: "Beamforming for Interference Mitigation in TDD System", IEEE 802.16 Presentation Submission Template (Ref. 9), Document No. IEEE S802.16m-08/653r2, Jul. 16, 2008, all pages.

Li, Qi et al..: "Uplink Interference Suppression among Neighbor Cells", IEEE C802.16m-08/730, IEEE 802.16 Broadband Wireless Access Working Group, Jul. 7, 2008, all pages.

Kim, Sunam et al.: Interference Mitigation Using FFR and Multi-Cell MIMO in Downlink, IEEE C802.16M-08/783r1, IEEE 802.16 Broadband Wireless Access Working Group, Jul. 16, 2008, all pages.

Lim, Dongguk et al.: "ICI Mitigation Using PMI Restriction in Multi-Cell Environments", IEEE C802.16m-08/784, Jul. 7, 2008, all pages.

Liu, Lingjia et al.: "Multi-cell MIMO Schemes for IEEE 802.16m", Document No. IEEE S802.16M08/632r2, Jul. 7, 2008, all pages.

Samsung: "Inter-Cell Interference Mitigation Through Limited Coordination", 3GPP TSG RAN WG 1 Meeting #54, R1-082886, Jeju, Korea, Aug. 18-22, 2008, all pages.

Samsung: "Further discussion on Inter-Cell Interference Mitigation through Limited Coordination", 3GPP TSG RAN WG1 Meeting #55, R1-084173, Prague, Czech Republic, Nov. 10-14, 2008, all pages.

\* cited by examiner

PASSIVE COORDINATION IN A CLOSED LOOP MULTIPLE INPUT MULTIPLE OUTPUT WIRELESS COMMUNICATION SYSTEM

FIELD OF THE INVENTION

This invention relates to wireless communication systems, and in particular, to a mechanism for coordination among base stations in a closed-loop multiple-input multiple-output wireless communication system.

BACKGROUND OF THE INVENTION

In mobile broadband cellular communication systems, there are several physical layer techniques that require a transmitter to be provided with knowledge of the channel response between the transmitter and a receiver. Transmission techniques that make use of the channel response between the transmitter and receiver are called closed-loop transmission techniques. One example of closed-loop transmission is the use of transmit precoding at the transmitter. An antenna array employing transmit precoding comprises of an array of multiple transmit antennas where the signals fed to each antenna are weighted in such a way as to control the characteristics of the transmitted signal energy according to some pre-defined optimization strategy, e.g. beamforming.

Generally, in such closed-loop multiple-input multiple-output (CL-MIMO) wireless communication systems, the transmitted antenna signals are weighted by applying weight vectors to multiple transmit antennas based on knowledge of the space-frequency channel response between each transmit antenna and each receive antenna. The transmitter uses these weight vectors and attempts to optimize the beamforming characteristics of the transmitted signal to be processed by the receiving device.

In those cases where a subscriber station (SS) or mobile station (MS) is located near the edge of a coverage cell of a base station (BS), where a signal strength is low and could be lost due to interference from a close neighboring cell, it has been envisioned that a neighboring BS can synchronize with a serving BS to provide additional coverage for this cell edge area and any MSs therein, and use beamforming to reduce interference for this MS. In particular, it is envisioned that downlink (DL) coordinated CL-MIMO is most useful for cell-edge users that are interfered by adjacent sector signals, and that a signal can be enhanced through DL beamforming from serving sector. In addition, interference can be avoided through DL beam nulling from adjacent sectors One technique to control the transmit characteristics to this cell edge area is based on uplink feedback messages from a MS, such as can be obtained from an uplink control channel or uplink Channel Quality Indicator (CQI) channel, where the MS measures the channel response from the broadcast dedicated pilot signals for demodulation between the serving and neighboring BS antennas and the MS antennas, and transmits a feedback message back to one or both of the BSs containing enough information that enables the BS to perform closed loop transmit precoding. The BSs must then actively coordinate their transmissions to be synchronized. This requires an excessive amount of communication overhead, inasmuch as every transmission will require feedback from the MS to both BSs, the serving BS must set up the synchronization and beamforming parameters with the neighboring BS and must provide the message for the MS to the neighboring BS over a backhaul connection.

Accordingly, what is needed is a technique to provide passive coordination between base stations in order to alleviate the above described problems. In particular, a proposed solution should be supported with a regular backhaul connection and minimizing backhaul usage. In addition, it would be beneficial if a Signal-to-Interference plus Noise Ratio (SINR) is predictable, and if SINR feedback from a MS can match the real SINR with beamforming and interference nulling in order to improve scheduler efficiency. It would also be beneficial to reduce latency between scheduling and transmissions to a MS.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DESCRIPTION OF THE PREFERRED EMBODIMENTS

The present invention provides a technique to provide passive coordination between base stations in order to alleviate the previously described problems. In particular, the present invention supports a regular backhaul connection and minimizes backhaul usage. The present invention provides a predictable Signal-to-Interference plus Noise Ratio (SINR) at a MS that can match the real SINR with beamforming and interference nulling in order to improve scheduler efficiency. The present invention also provides reduced latency between scheduling and transmissions to a MS. It is envisioned that the present invention is applicable to any communication system that uses transmit beamforming. As used herein, the present invention is described in terms of an IEEE 802.16 WiMAX communication system, but the present invention could be used equally well in other communication systems such as Long Term Evolution (LTE), for example.

Figure 1:
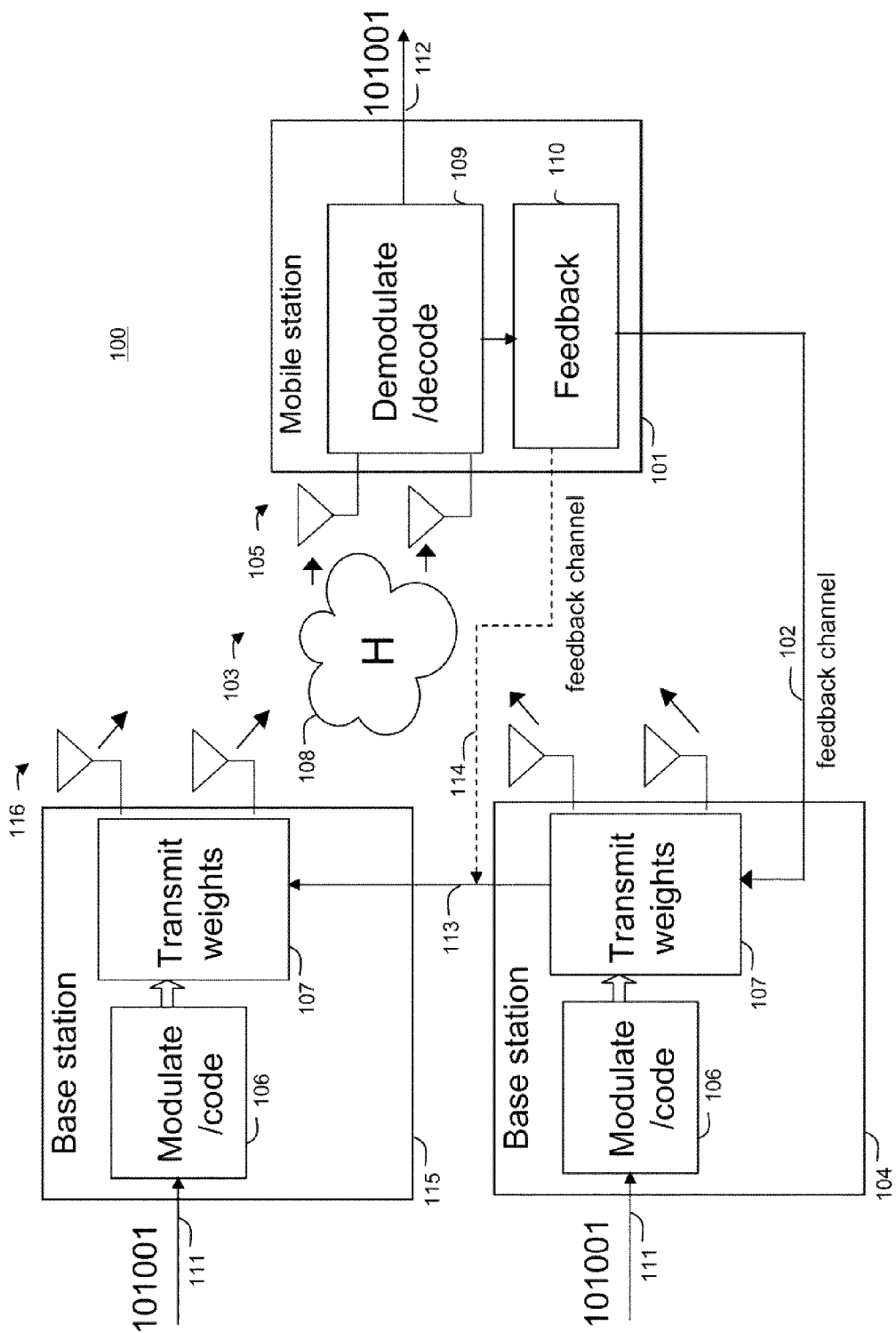
FIG. 1 shows a block diagram of a system of the present invention.

FIG. 1 shows a block diagram of communication system 100, in accordance with the present invention. The communication system can include a plurality of cells (only two represented here) each having a base station (BS) 104, 115 in communication with one or more mobile stations (MS) 101 in a particular cell edge zone. If closed loop transmission is to be performed on the downlink 103 to MS 101, the BSs 104, 115 can be referred to as source communication units, and the MS 101 can be referred to as a target communication unit. In one embodiment of the present invention, communication system 100 utilizes an Orthogonal Frequency Division Multiplexed (OFDM) or other multicarrier based architecture. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM), or may be based on simpler time and/or frequency division multiplexing/multiple access techniques, or a combination of these various techniques. In addition, in alternate embodiments the communication system may utilize other cellular communication system protocols such as, but not limited to, TDMA, direct sequence CDMA (DS-CDMA), and the like.

A serving BS 104 and a neighboring BS 115 includes transmit adaptive antenna arrays (TxAA) 116 having a plurality of antenna elements (only two shown) operable to communicate a beamformed data stream to a MS 101 having one or more receive antennas 105 (i.e., a Multiple Input Multiple Output MIMO system). The input data-stream 111 is modulated and coded 106 and then multiplied by transmit weights 107 before being fed to the TxAAs 116 to be synchronously transmitted to the MS 101. Multiplying the input data-stream 111 by transmit weights 107, where the transmit weights are based on at least a partial channel response, is one example of tailoring a spatial characteristic of the transmission. The signals transmitted from each TxAA 116 propagate through matrix channels 108 and are received by one or more of the receive antennas 105. The signals received on the one or more receive antennas 105 are demodulated and decoded 109 to produce the output data-symbol stream 112. It should be noted that the data stream 111 to the neighboring BS 115 can be supplied by a scheduler or through the serving BS 104 over a backhaul connection 113.

In accordance with the present invention, the at least one MS 101 performs feedback measurements 110 based on the channels 108 and provides these measurements through an uplink feedback channel 102 to the serving BS 104. This feedback can be supplied to the neighboring BS 115 either through the backhaul connection 113 from the serving BS 104 or directly from the MS 101 via another feedback channel. The feedback may include a sounding waveform, channel quality indicator, analog feedback (channel covariance coefficients, channel coefficients, or precoding matrix coefficients, or coefficients of an eigenvector of a covariance matrix), or codebook-based precoding matrix index feedback. In accordance with the present invention, the BSs 104, 115 then derive the transmit weights 107 accordingly, in order to define the beamformed downlink reception by the MS, as will be detailed below.

In one example as is known in the art, the downlink channel is measured by an MS which provides feedback on an UL sounding channel or CQI channel, for example. Each base station estimates the channel response on each antenna based on the feedback, and calculates transmit (Tx) weights to be used. Each Tx signal is then weighted to maximize the received signal to noise ratio (SNR) for a beamformed transmission. The BS internally applies the Tx weights to the channel responses to derive the beamformed channel response that will be seen by the MS. This effectively "steers" the transmit array such that it is "aimed" at the MS that provided the feedback. A separate weight can be computed for each modulated subcarrier.

Figure 2:
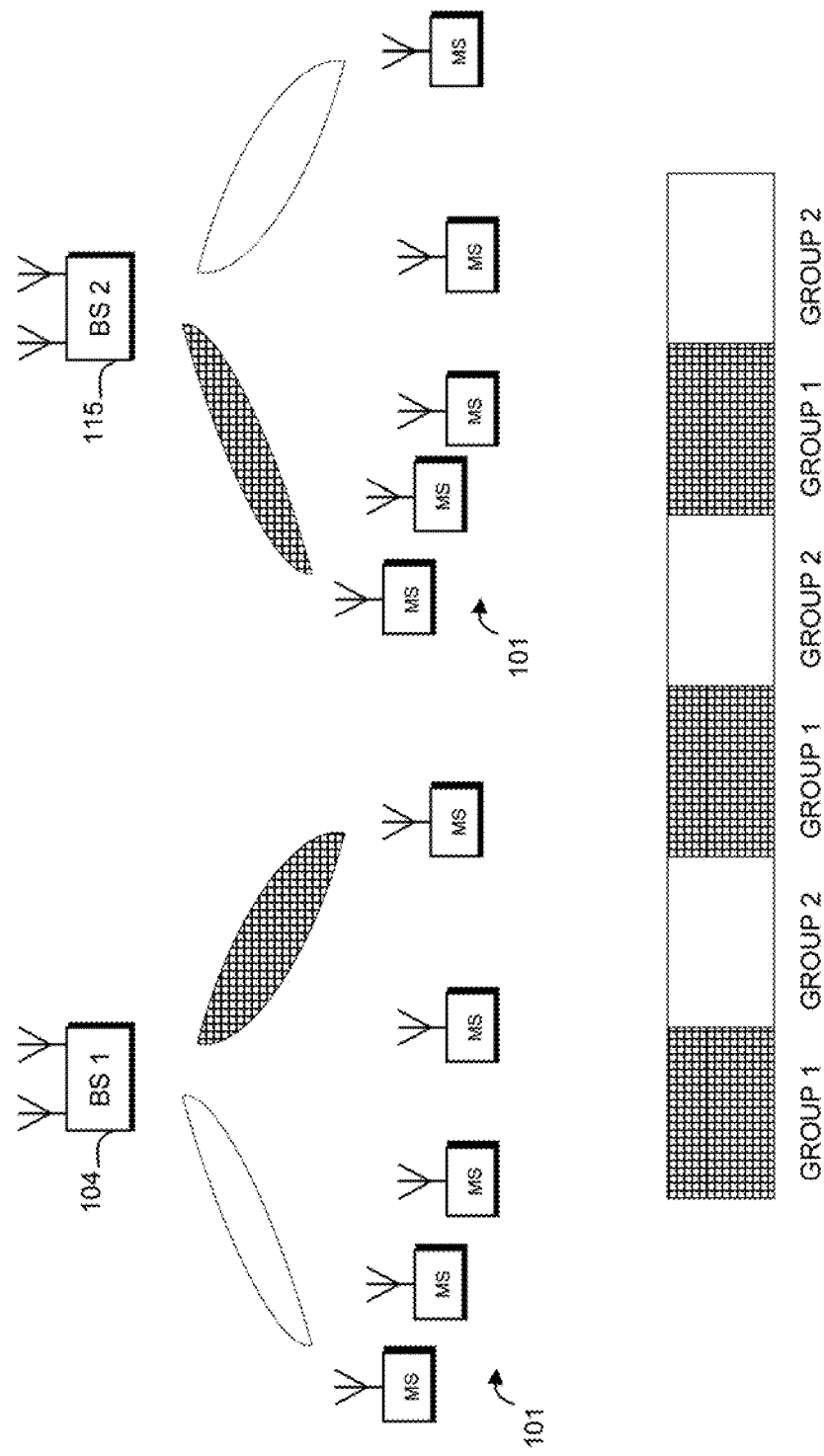
FIG. 2 shows a block diagram of an embodiment of the present invention.

FIG. 2 shows an implementation of the present invention. A serving BS 104 and a neighboring BS 115 recognizes MSs 101 operating on a cell edge. For example, using existing beam combinations where each beam combination contains at least one beam from BS 104 and at least one beam from BS 115, the BSs may recognize that resources for MSs operating on the group 1 beam combination are allocated in one time-frequency resource block, and resources for MSs operating on the group 2 beam combination are allocated in another time-frequency resource block. In order for the BSs 104, 115 to provide synchronized communication to these cell-edge MSs, these particular time-frequency resource blocks form a zone that is dedicated for coordinated CL-MIMO for those BSs 104, 115 serving their associated cell edge MSs. The same zone is dedicated in every sector.

This zone is associated with a particular subframe (i.e. time/frequency) and different beams can be defined for different resource blocks within this zone. In particular, on each resource block (RB), at least one beam is pre-defined for each sector. The combination of the beams from different sectors defines a particular beam combination and subframe that are repeated in each resource block used in communicating with these cell edge MSs. Each combination may contain multiple beams from different sectors. As defined herein, a zone is a part of a subframe, and there are multiple resource blocks within a zone. Zones are synchronized across multiple BSs, which means that cell-edge mobiles from different BSs share the same time-frequency resource of the zone. Two combinations are shown in FIG. 2, Group 1 and Group 2. Each combination contains two beams. However, it should be noted that different RBs may have different beam combinations and may have multiple beams.

Figure 3:
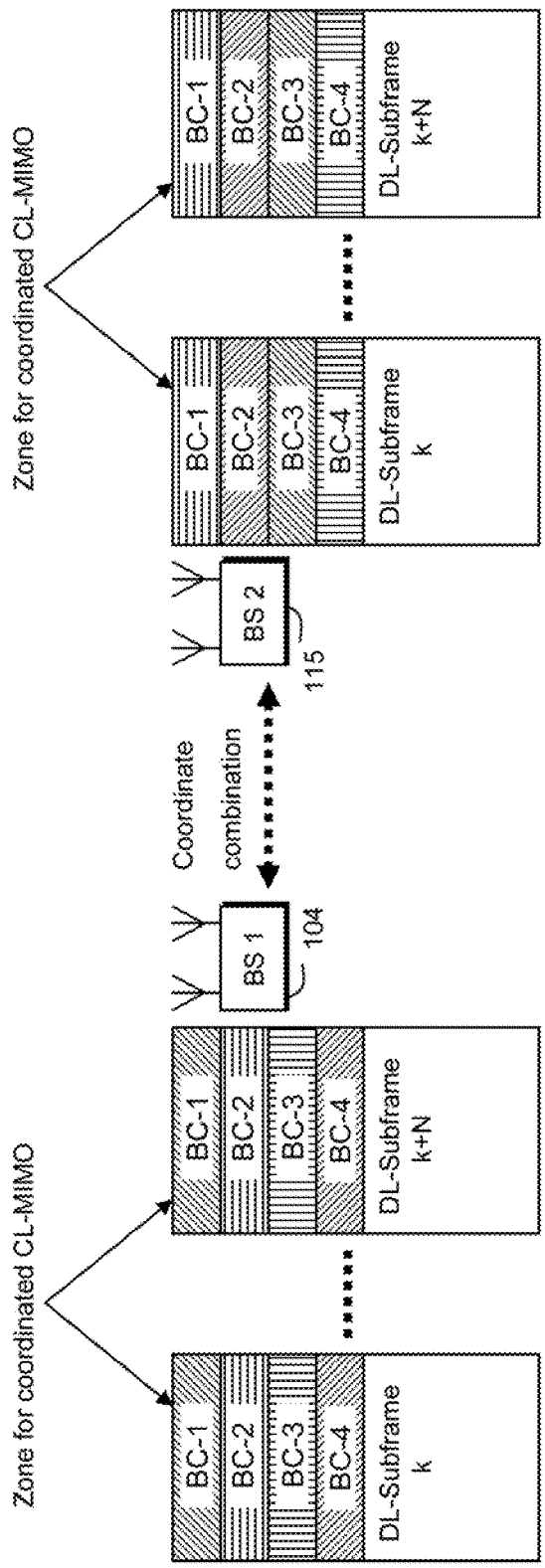
FIG. 3 shows a block diagram of a periodic subframe assignments, in accordance with the present invention.

FIG. 3 shows the specific resource block DL subframes used for the beam combinations. As shown, the same specific subframe (i.e. frequency/time) in periodic resource blocks is reserved for the same beam combinations, BC-1, BC-2, BC-3, BC-4 in each base station. It should be noted that different combinations can be allocated for different resource blocks. The bases stations should coordinate the change of these combinations such that the combination will be allocated for the resource block periodically. N is the period between resource blocks that the beam combinations repeat. It also corresponds to the period that the SINR repeats at the MS if the MS moves at slow speed. N can be chosen according to the delay between CINR or SINR feedback from the MS and DL scheduler that schedules the transmission to the MS. Optionally, the beam combination allocations on RBs may change order from subframe/frame to subframe/frame, but the sequence of change is still periodic. In this case, the allocation of beam combinations for each RB can change with BS coordination through the backhaul connection, which should occur on a slow time scale. These changes allow the system to change the size and location of the allocation zone to meet the dynamic needs of the MS.

In accordance with the present invention, this periodic repeating of beam combinations is done to provide passive coordination of CL-MIMO systems and periodic SINR (or CINR) at MS. In particular, a MS can provide feedback on transmissions using beam combination BC-1 in the first resource block of subframe k. Because the same beam combination BC-1 is maintained in the same resource block in a subsequent subframe/frame k+N, it can be assumed that the channel conditions and the corresponding CINR or SINR at MS for BC-1 in subsequent subframe/frame k+N are substantially the same also. Therefore, the same feedback for resource blocks in subframe/frame k can be used for accurately predicting the CINR or SINR at the resource blocks in subsequent subframe/frame k+N by a scheduler or a BS for each beam combination since the combinations are pre-defined periodically. Moreover, a scheduler or a BS can allocate a beam combination that leads to the best CINR or SINR by beamforming the desired signal and nulling the interference through BS coordination without any active communications—passive coordination of CL-MIMO systems. Both signal and interference combinations are periodic. In the present invention, single-user (SU) and multi-user (MU) MIMO can be supported with multiple beams in each combination. However, SU-MIMO is more likely to be used for cell-edge users.

The present invention envisions particular signaling requirements between the BS-BS backhaul signaling and the BS-MS DL/UL signaling. Backhaul signaling between BSs will be used to coordinate the zone allocation for cell-edge MSs and to coordinate beam combinations across sectors. Backhaul signaling would also be used to change these attributes. Backhaul signaling could also be used by a serving BS to provide the communication to the neighboring BS to be synchronously transmitted to the MS, or to provide feedback from the MS to the neighboring BS. BS DL signaling to the MS would be used to indicate to the MS that it is in a particular zone allocation having beam combinations of period N (see FIG. 3). This DL signaling would provide an allocation indication to indicate that the MS is allocated in the zone for cell-edge mobiles. By this indication, the MS may need to change the UL CQI feedback. For example, a MS that is not in a cell edge zone may only need to provide one feedback indication per subframe/frame. However, a MS that is in a cell edge zone could be asked to provide multiple feedback indications per resource block (such as for each of BC-1 through BC-4 from FIG. 3). MS UL signaling to a BS allows a cell-edge MS to feedback CQI (i.e. SINR or CINR) corresponding to each RB in the zone. This feedback can be provided to the serving BS and the neighboring BS. The MS UL signaling can also be used by the MS to indicated to the BS the top-M combinations and the corresponding resource blocks that it prefers (i.e. provide the best quality) to reduce overhead, or some other methods to feedback the CQI for the RBs in the zone. The scheduler can schedule a user based on its preferred combinations. This allows enhanced signaling through DL beamforming in a serving sector, and reduces interference through nulling in other sectors. More importantly, the passive coordination closed-loop multiple-input multiple-output scheme in this invention does not require extensive backhaul signal overhead for coordinating base stations. The SINR (or CINR) at MS can be improved by enhancing desired signal through beamforming and reducing interference through beam nulling. Since this scheme does not require active coordination between schedulers at different base stations, the delay latency for data transmission is the same as that in a conventional closed-loop multiple-input multiple-output without coordination.

Figure 4:
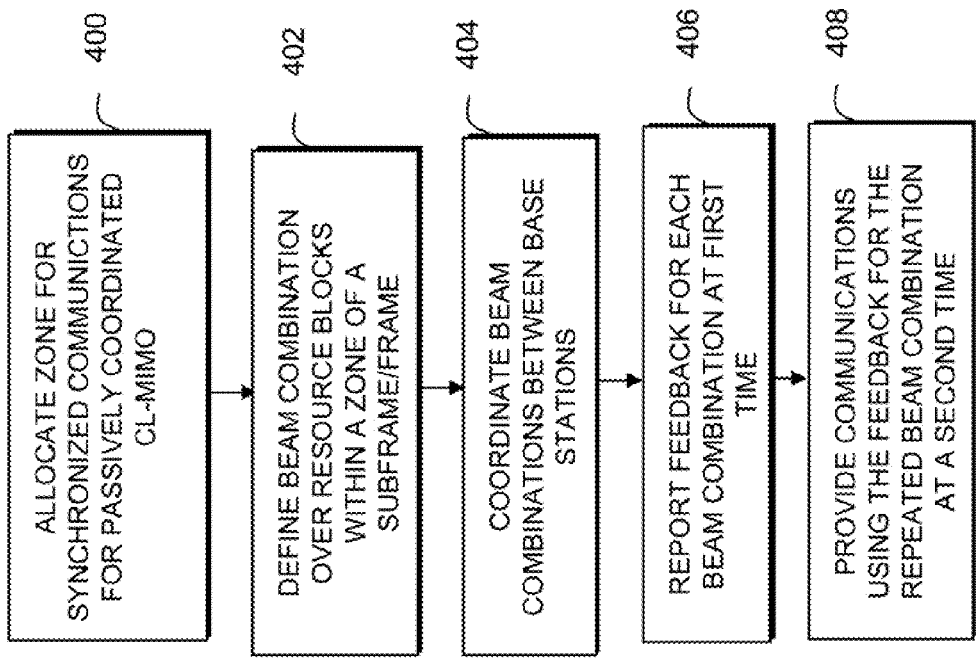
FIG. 4 shows a flow chart illustrating a method of the present invention.

FIG. 4 shows a flowchart that illustrates a method for passive coordination in a closed-loop multiple-input multiple-output wireless communication system, in accordance with the present invention.

A first step 400 includes allocating a subframe zone, to be used by a serving base station and a neighboring base station to provide synchronized communications to users in a cell edge area between the base stations.

A next step 402 includes defining at least one antenna beam over at least one resource block within the allocated zone of a subframe for each base station. The base station can signal the zone allocation and resource block allocation to a mobile station in the zone. Preferably, the same zone is dedicated in every cell sector. In addition, one beam combination contains multiple beams from multiple base stations. It should be noted that, different resource blocks can utilize different beam combinations. Optionally, the at least one beam combination can be changed from subframe to subframe on resource blocks as long as the change is periodic.

A next step 404 includes coordinating and synchronizing the at least one beam combination and at least one resource block of the zone between the base stations.

A next step 406 reporting measured channel quality indication feedback for the zone at a first time for the at least one beam combination and associated resource block of the zone, and preferably all beam combinations and associated resource blocks of the zone. The channel quality indication (CQI) feedback can include a Carrier-to-Interference plus Noise Ratio and/or a Signal-to-Interference plus Noise Ratio for each combination. If a mobile station is aware of being in a cell edge zone, the mobile station can report feedback for the beam combinations and associated resource blocks of the zone. This can include reporting feedback for all beam combinations or just those combinations and associated resource block of the zone providing the best channel conditions.

A next step 408 providing synchronized communications using the feedback by the base stations over the zone at a second time by repeating the same at least one beam combination and associated resource block of the zone for each base station. A period between the first and second times where the at least one beam combination and associated resource block of the zone repeats corresponds to a delay between the reporting and providing steps. If a base station is aware of the beam combinations and associated resource block of the zone providing the best channel conditions for the mobile station, the base station can provide communications using the beam combinations and associated resource blocks of the zone providing the best channel conditions.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for passive coordination of base stations in a closed-loop multiple-input multiple-output wireless communication system, the method comprising the steps of:
    allocating a subframe zone to be used by a serving base station and a neighboring base station to provide synchronized communications to mobile stations;
    defining an antenna beam combination for the base stations, the beam combination to be used over at least one resource block of the allocated zone;
    reporting feedback on measured channel conditions for the zone at a first time for the at least one beam combination and associated resource block of the zone; and
    providing synchronized communications to mobile stations using the feedback by the base stations over the zone at a second time by repeating the same associated at least one beam combination and associated resource block of the zone.

2. The method of claim 1, wherein in the allocating step the zone is used for cell edge areas between the base stations.

3. The method of claim 1, wherein the reporting step includes providing a Channel Quality Indicator which consists of at least one of a Carrier-to-Interference plus Noise Ratio and a Signal-to-Interference plus Noise Ratio for at least one beam combination and associated resource blocks of the zone.

4. The method of claim 1, wherein in the allocating step the same zone is dedicated in every cell sector.

5. The method of claim 1, wherein in the defining step the antenna beams can contain multiple beams.

6. The method of claim 1, wherein in the defining step, different resource blocks utilize different antenna beams.

7. The method of claim 1, wherein a period between the first and second times where the at least one beam combination and associated resource block of the zone repeats corresponds to a delay between the reporting and providing steps.

8. The method of claim 1, further comprising the step of coordinating the at least one beam combination and associated resource block of the zone between the base stations.

9. The method of claim 8, wherein the defining step includes changing the at least one beam combination and associated resource block of the zone from subframe to subframe as long as the change is periodic.

10. The method of claim 1, wherein the defining step includes a base station signaling the zone allocation and associated at least one beam combination and associated resource block of the zone to a mobile station, and wherein the reporting step includes the mobile station reporting feedback for at least one beam combination and associated resource blocks of the zone.

11. The method of claim 1, wherein the reporting step includes reporting feedback corresponding to the beam combinations and associated resource blocks of the zone providing the best channel conditions.

12. The method of claim 11, wherein the providing step includes providing communications using the beam combinations and associated resource blocks of the zone providing the best channel conditions.

13. A method for passive coordination of base stations in a closed-loop multiple-input multiple-output wireless communication system, the method comprising the steps of:
    allocating a subframe zone to be used by a serving base station and a neighboring base station provide synchronized communications to mobile stations in a cell edge area between the base stations;
    defining at least one antenna beam combination for the base stations, the at least one beam combination to be used over at least one resource block of the allocated zone;
    coordinating the at least one beam combination and associated resource block of the zone between the base stations;
    reporting measured channel quality indication feedback for the zone at a first time for the at least one beam combination and associated resource block of the zone; and
    providing synchronized communications to mobile stations using the feedback by the base stations over the zone at a second time by repeating the same associated at least one beam combination and associated resource block of the zone.

14. The method of claim 13, wherein in the defining step, different resource blocks utilize different antenna beam combinations.

15. The method of claim 13, wherein a period between the first and second times where the at least one beam combination and associated resource block of the zone repeats corresponds to a delay between reporting the feedback and a downlink transmission in the providing step.

16. The method of claim 13, wherein the defining step includes changing the at least one beam combination and associated resource block of the zone from subframe to subframe as long as the change is periodic.

17. The method of claim 13 wherein the reporting step includes reporting feedback corresponding to the beam combinations and associated resource blocks of the zone providing the best channel conditions.

18. The method of claim 17, wherein the providing step includes providing communications using the beam combinations and associated resource blocks of the zone providing the best channel conditions.

19. A closed-loop multiple-input multiple-output wireless communication system providing passive coordination of base stations, the system comprising:
    base stations operable to; allocate a subframe zone for providing synchronized communications to mobile stations, and define at least one antenna beam combination for the base stations, the beam combination to be used over at least one resource block of the allocated zone, and
    a mobile station operable to report feedback on measured channel conditions for the zone at a first time for the at least one combination and associated resource block of the zone,
    whereupon the base stations provide synchronized communications to mobile stations using the feedback over the zone at a second time by repeating the same associated at least one beam combination and associated resource block of the zone.

* * * * *